(12) United States Patent
Zanotti (10) Patent No.: US 10,618,754 B2
(45) Date of Patent: Apr. 14, 2020

(54) HANDLING SYSTEM FOR TRANSPORT UNITS OF LIVE POULTRY IN A SLAUGHTERHOUSE

(71) Applicant: Massimo Zanotti, Gussago (IT)

(72) Inventor: Massimo Zanotti, Gussago (IT)

( * ) Notice: Subject to any disclaimer, the term of this patent is extended or adjusted under 35 U.S.C. 154(b) by 0 days.

(21) Appl. No.: 14/533,876

(22) Filed: Nov. 5, 2014

(65) Prior Publication Data

US 2015/0125243 A1 May 7, 2015

(30) Foreign Application Priority Data

Nov. 5, 2013 (IT) .............................. TO2013A0899

(51) Int. Cl.
*B65G 67/24* (2006.01)
*A01K 45/00* (2006.01)
*A22B 1/00* (2006.01)

(52) U.S. Cl.
CPC ............ *B65G 67/24* (2013.01); *A01K 45/005* (2013.01); *A22B 1/00* (2013.01)

(58) Field of Classification Search
CPC ......... A01K 45/005; B65G 67/24; A22B 1/00
USPC ................... 414/390, 395, 398, 406; 452/53
See application file for complete search history.

(56) References Cited

U.S. PATENT DOCUMENTS

| | | | |
|---|---|---|---|
| 3,891,097 A | 6/1975 | Shackelford | |
| 5,735,664 A * | 4/1998 | Jerome | ..................... A22B 1/00 119/845 |
| 2014/0283755 A1 * | 9/2014 | Zanotti | .................. A01K 31/07 119/489 |
| 2014/0287667 A1 * | 9/2014 | Zanotti | .................. A22B 3/005 452/53 |
| 2014/0299067 A1 * | 10/2014 | Foreman | .............. A01K 45/005 119/453 |
| 2014/0338610 A1 * | 11/2014 | Zanotti | ................ A01K 45/005 119/453 |

FOREIGN PATENT DOCUMENTS

| | | |
|---|---|---|
| EP | 0061869 A1 | 10/1982 |
| EP | 0326422 A2 | 8/1989 |
| EP | 0956766 A1 | 11/1999 |
| EP | 1330952 A2 | 7/2003 |
| EP | 2 868 202 A1 | 5/2015 |
| IT | 2013A000214 | 3/2013 |
| WO | 2011/010329 A1 | 1/2011 |
| WO | 2015/068014 A1 | 5/2015 |

OTHER PUBLICATIONS

Italian Search Report for corresponding Italian Patent Application No. TO20130899 completed on Jul. 9, 2014.

* cited by examiner

*Primary Examiner* — Kaitlin S Joerger
(74) *Attorney, Agent, or Firm* — Thomas|Horstemeyer, LLP (57) ABSTRACT

A handling system for transport units of live poultry in a slaughterhouse, includes an inlet station, a transfer line to receive drawer-like cages extracted from supporting frames of the transport units, and an extraction device. Between the inlet station and the transfer line a rigid receiving structure of the two stacks of drawer-like cages is interposed, vertically displaceable between a position of simultaneous receipt of the two stacks of extracted drawer-like cages and a separate depositing position of the drawer-like cages of each stack onto the transfer line.

18 Claims, 8 Drawing Sheets

HANDLING SYSTEM FOR TRANSPORT UNITS OF LIVE POULTRY IN A SLAUGHTERHOUSE

CROSS REFERENCE TO RELATED APPLICATIONS

This application claims priority from Italian patent application No. TO2013A000899, filed on Nov. 5, 2013, the entire disclosure of which is incorporated herein by reference.

FIELD OF THE INVENTION

The present invention relates in general to the handling of live poultry in the context of slaughterhouses, with particular reference to the unloading operations of the poultry coming to the slaughterhouse in transport units carried on board lorries.

STATE OF THE PRIOR ART

The patent documents EP-1330952B1 and WO-2011/010329, of which the Applicant is co-inventor, describe transport units of live poultry including a supporting frame for a plurality of superimposed drawer-like cages and slidably extractable along horizontal guides through an extraction side of the supporting frame. The supporting frame can contain a single stack of superimposed drawer-like cages, as in the case of the already cited documents EP-1330952B1 and WO-2011/010329, or can be configured as described and illustrated in Italian patent application no. TO2013A000214 by the same Applicant, not published at the date of filing of the present application, to contain two side-by-side stacks of superimposed drawer-like cages.

The handling systems currently in use on the premises of chicken slaughterhouses comprise an inlet station of the transport units picked up from the platform of the lorry and at least one transfer line arranged transversely to the inlet station to receive the drawer-like cages extracted from the supporting frames. The extraction is normally carried out with the aid of a mechanized extraction device of the drawer-like cages located, with respect to the inlet station, on the opposite side to the transfer line and designed to extract the drawer-like cages by pushing them through the aforesaid extraction side of the respective supporting frames. The extraction device can be configured to simultaneously extract, at the most, a single stack of superimposed drawer like cages.

For this reason, the current extraction devices including horizontally mobile elements and elevators with movable shelves mounted on roller chains, do not allow obtainment of the necessary unloading efficiency of the drawer-like cages, which would instead be desirable, to allow reduction of the time required to continuously supply the slaughterhouse facility, with the advantage of an improved overall speed of the facility. In addition, the chains of the movable shelves of the elevators suffer from elongations that alter the pitch of the shelves themselves, therefore further compromising the efficiency of extraction of the drawer-like cages. Finally, the extraction devices currently in use do not allow unloading of the drawer-like cages directly from the transport lorries, so that the use of forklift trucks is normally require for removal of the transport units from the platform of the lorry and their deposit on the inlet station.

From the documents EP-0956766 and EP-0061869, handling systems for transport units of live poultry are known, corresponding to the pre-characterizing part of claim 1.

SUMMARY OF THE INVENTION

The object of the present invention is to overcome the aforesaid drawbacks and to produce a handling system for transport units of live poultry of the type defined above, which allows an appreciable increase in the operational efficiency and the speed of supplying poultry to the slaughterhouse, so as to improve its productivity.

A further object of the invention is that of producing a handling system for transport units of live poultry, which also enables unloading the drawer-like cages from the relative transport units kept on board the lorries, without the need to remove the relative supporting frames.

A further object of the invention is that of being able to quickly release the supporting frames of the transport units to enable them to be washed during the removal of the relative drawer-like cages, in favor of more extensive, and therefore more efficient, washing times without affecting the operating times of the handling system, and therefore of the slaughterhouse facilities.

According to the invention, these objects are achieved thanks to a handling system defined in the preamble of claim 1, whose unique characteristic lies in that the extraction device is configured to simultaneously extract two stacks of superimposed drawer-like cages from two respective transport units arranged in a side-by-side condition, transversely to the transfer line, and in that between the inlet station and the transfer line, a rigid receiving structure of the two stacks of superimposed drawer-like cages is interposed, which is equipped with supports arranged as horizontal guides of the supporting frames, said rigid receiving structure being vertically displaceable between a position of simultaneous receipt of the two extracted superimposed stacks of drawer like cages and a separate depositing position of the drawer-like cages of each stack onto said transfer line.

The rigid receiving structure is preferably closed laterally and at the top, so as to maintain the poultry contained in the two stacks of drawer-like cages in a condition of semi-darkness, which facilitates handling while the animals are conscious.

The inlet station can consist of a motorized conveyor suitable for receiving the transport units unloaded from the loading platform of a transport vehicle or, more conveniently, from the transport vehicle itself.

The inlet station is advantageously associated with a washing station of the supporting frames of the transport units following the extraction of the relative drawer-like cages.

BRIEF DESCRIPTION OF THE DRAWINGS

The invention will now be described in detail with reference to the accompanying drawings, provided purely by way of non-limiting example, in which.

DETAILED DESCRIPTION OF THE INVENTION

Figure 1:
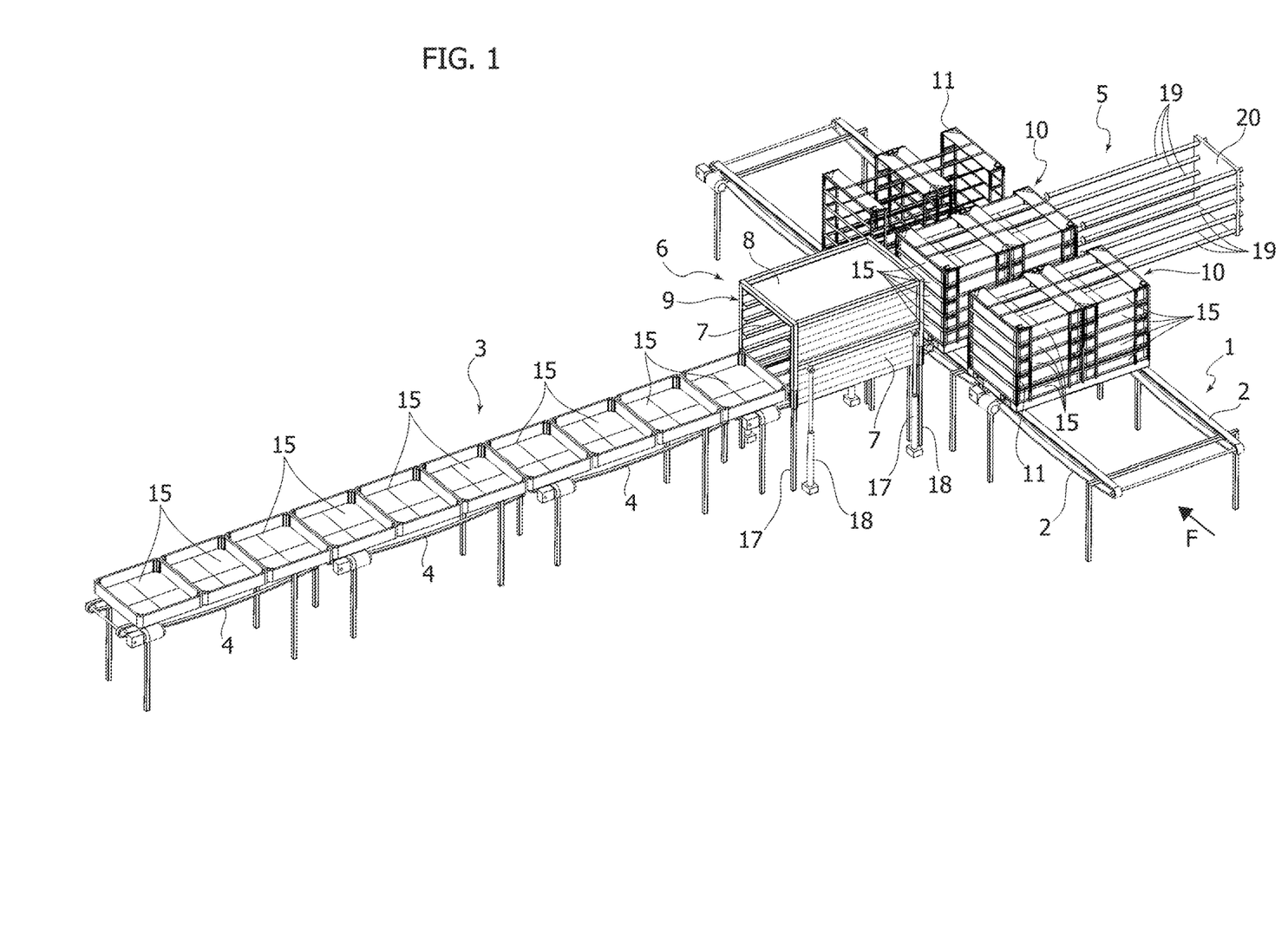
FIG. 1 is a schematic perspective view showing a first embodiment of a handling system for transport units of live poultry according to the invention.

Initially referring to FIG. 1, in a first embodiment of the invention, the handling system of live poultry in a slaughterhouse essentially comprises an inlet station 1, in this case formed by a conveyor with motorized chains 2, a transfer line 3 arranged transversely to the conveyor 2 of the inlet station 1 and formed by successive sections, also with motorized chains 4, to supply the slaughterhouse facility, and a mechanized extraction device indicated schematically with numeral 5 and arranged, with respect to the inlet station 1, on the opposite side to the transfer line 3, in alignment with this. Between the inlet station 1 and the transfer line 3, a rigid receiving structure 6 is arranged, which will be discussed below.

Figure 7:
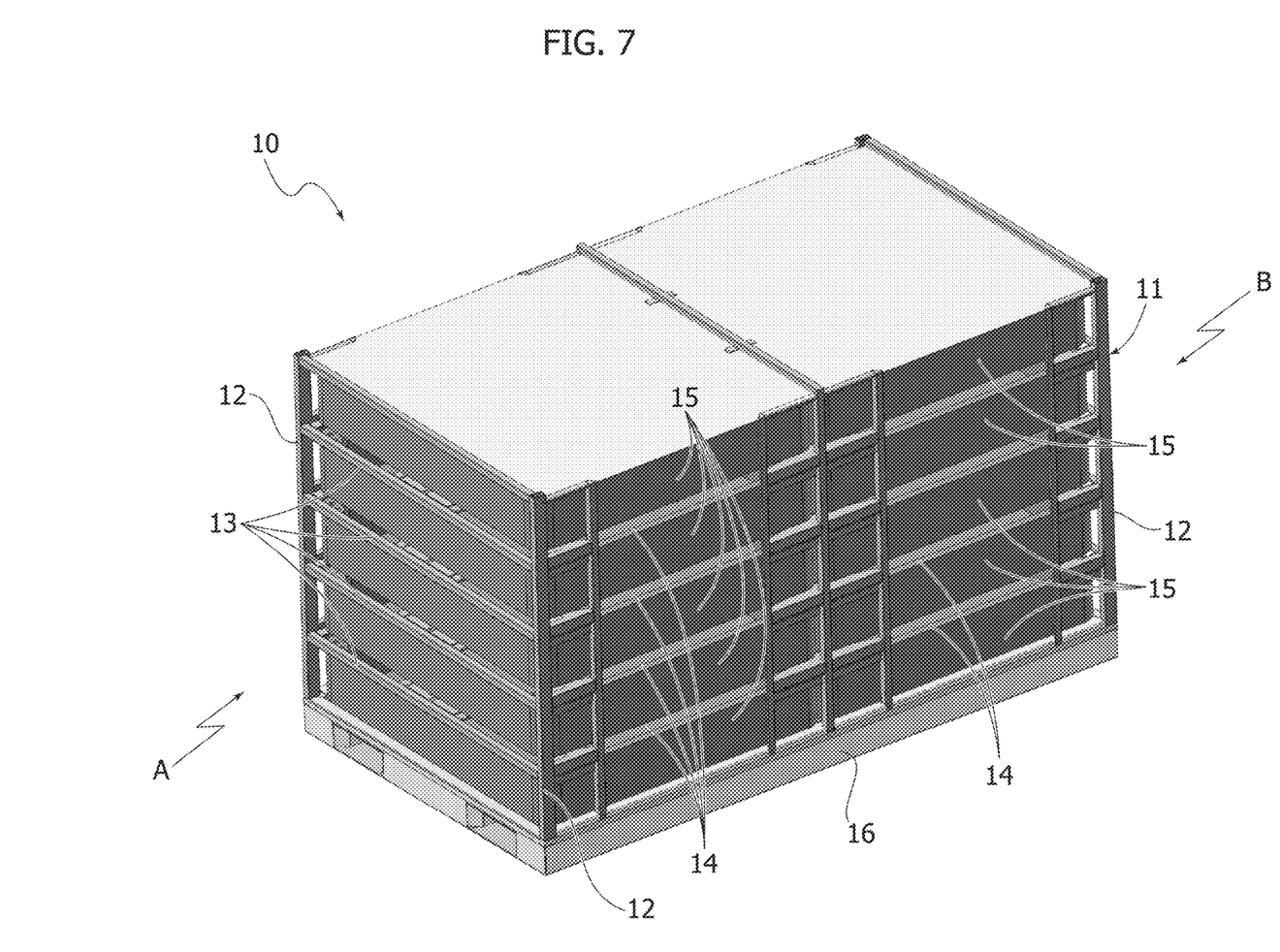
FIG. 7 is a schematic perspective view that shows a first transport unit of live poultry usable in the handling system according to the invention.

The inlet station 1 is designed to sequentially receive transport units of live poultry, indicated by 10, one of which is represented in greater detail in FIG. 7. This transport unit 10 is of the type described and illustrated in Italian patent application no. TO2013A000214 by the same Applicant: this includes a sturdy metal supporting frame 11 having a rectangular layout and formed by vertical uprights 12 interconnected at the short sides of the frame 11 by the horizontal elements 13 and along the long sides by horizontal guides 14 on which the drawer-like cages 15 slidably rest for containment of the live poultry. In this case, the drawer-like cages 15 are arranged in a superimposed condition on two side-by-side stacks and are extractable from the supporting frame 11 through either of its short sides, indicated respectively with A and B. The supporting frame 11 may be provided at the bottom with a pallet 16 for the handling of the transport unit 10 by means of a forklift truck.

Figure 8:
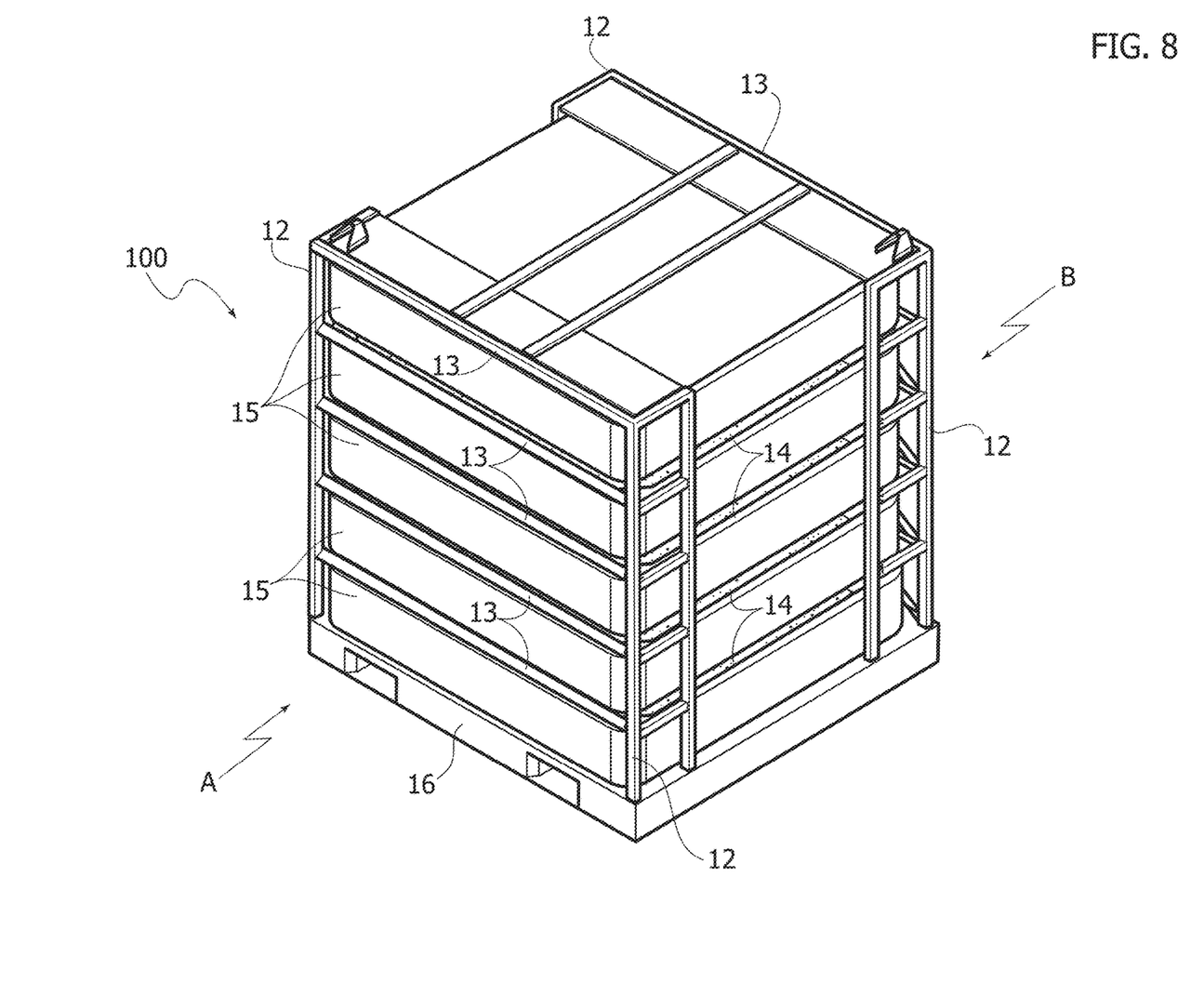
FIG. 8 is a schematic perspective view showing a second-transport unit of live poultry also usable in the handling system according to the invention.

Alternatively, the transport module has the structure indicated by 100 in FIG. 8, instead of the double configuration described above, in which the supporting frame 11, also in this ease formed by vertical uprights 12, horizontal elements 13 and horizontal sliding guides 14, has smaller dimensions and is suitable for the containment of a single stack of drawer-like cages 15. The removal side of the drawer-like cages 15, slidable from the supporting frame 11 of the transport unit 100 is that indicated by A, or that indicated by B.

Returning now to FIG. 1, the transport units, in this case the double units 10, are picked up from a transport lorry and deposited, by means of a forklift truck, onto the conveyor 2 of the inlet station 1, with the sides A and B arranged parallel to the advancing direction of the conveyor, indicated by F. The transport units 10 are then made to successively advance so as to be positioned, in turn, in the area between the receiving structure 6 and the extraction device 5.

Figure 2:
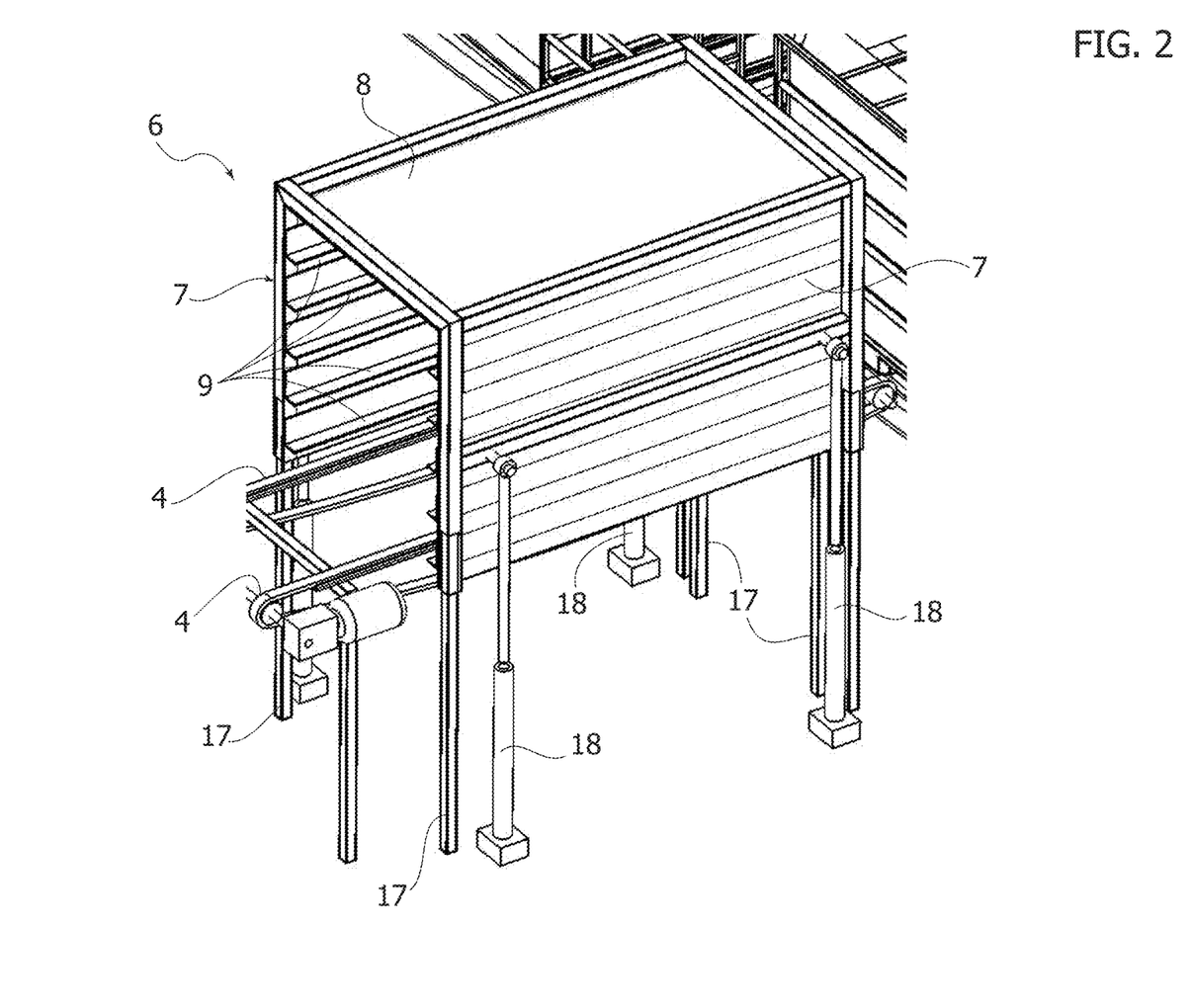
FIG. 2 shows a detail of FIG. 1 on an enlarged scale.

The receiving structure 6 is represented in greater detail in FIG. 2: it consists of a rigid bell or chest with dimensions corresponding to those of the frames 11 of the transport unit 10, having side walls 7 and a top wall 8. The side walls 7 have internally sliding guides 9 spaced horizontally and vertically like the sliding guides 14 of the transport units 10.

The rigid receiving structure 6 is slidably mounted on vertical guides 17, along which it is displaceable, for example via fluid jacks 18, above the initial end of the transfer line 3.

The extraction device 5, as shown schematically in FIG. 1, comprises a series of horizontal thrust bars 19 carried by a plate 20 which is displaceable along a support structure (not shown), by means of motorized actuators (also not shown), between a retracted position with respect to the conveyor 2 of the inlet station 1 and an advanced position: in this way, the drawer-like cages 15 of the two stacks contained in the transport unit 10, in turn positioned at the extraction device 5, are simultaneously extracted from the relative supporting frame 1, by pushing through side A or side B, and transferred into the receiving structure 6, sliding along the relative horizontal guides 9, in a parallelly-aligned condition to the transfer line 3.

Once the transfer of the two stacks of drawer-like cages 15 is completed, the receiving structure 6 is lowered in successive steps to deposit the drawer-like cages 15 of the two stacks in twos on the transfer line 3, which then sends them to the successive stations of the slaughterhouse.

The receiving structure 6 therefore allows simultaneous receipt of all the drawer-like cages 15 of the two stacks contained in each transport unit 10, or all the drawer-like cages 15 of one stack contained in a transport unit 10 and all the drawer-like cages 15 of one stack contained in another adjacent transport unit 10, so that the supporting frames 11 are entirely liberated in a short time in order to be then transferred to a washing station for their cleaning before returning of the transport units 10 to the poultry farming site. This allows, in practice, overlapping of the removal time of the drawer-like cages 15 with the washing time of the supporting frames 11, in favor of longer washing, which is therefore more effective.

The rigidity of the receiving structure 6 allows the guarantee of a uniform and constant distance between its sliding guides 9, and therefore the constant and correct alignment with the sliding guide 14 of the transport units 10, in turn emptied by the extraction device 5. The walls 7 and 8 allow the poultry contained in the two stacks of drawer-like cages, in turn transferred into the receiving structure 6 to be kept in a condition of semi-darkness, which facilitates the handling while the animals are conscious.

As will be seen below, when transport units 100 are used in place of the double transport units 10, the receiving structure 6 is configured in such a way as to receive, in turn, two stacks of drawer-like cages 15 extracted from the supporting frames 11 of two contiguous units 100.

Figure 3:
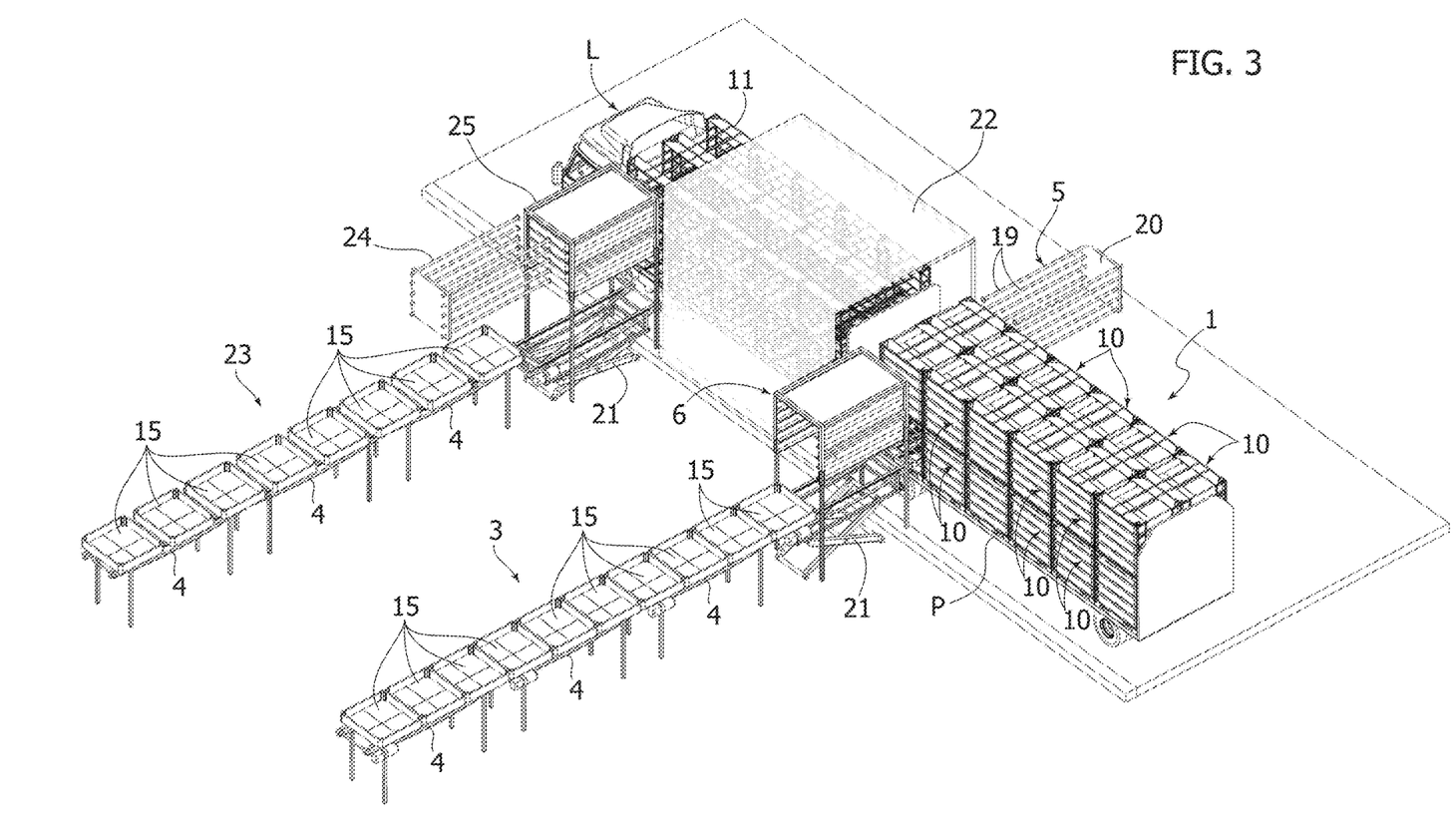
FIG. 3 is an analogous view to FIG. 1 showing a second embodiment of the handling system according to the invention.
Figure 4:
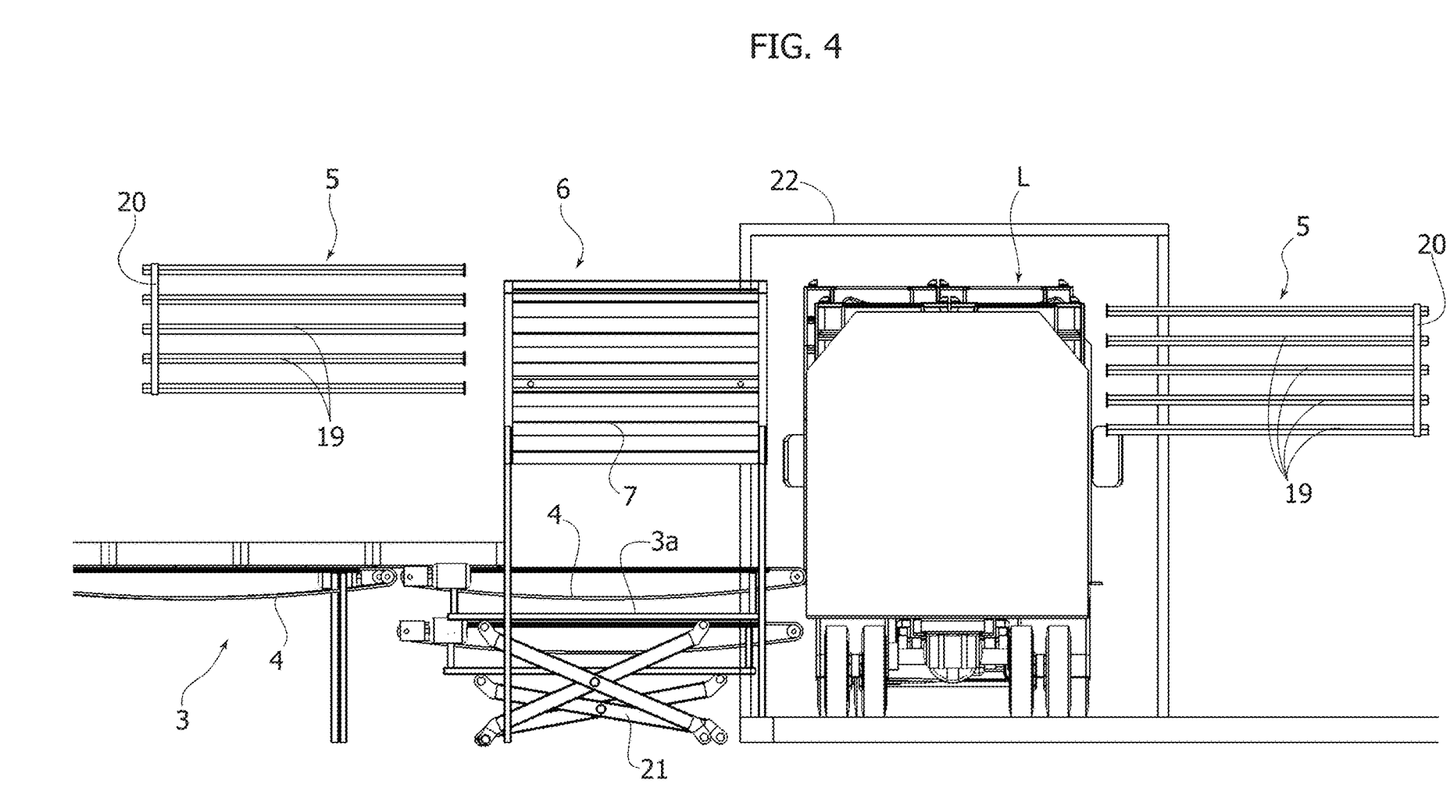
FIG. 4 is a side elevational view of FIG. 3, on an enlarged scale.
Figure 5:
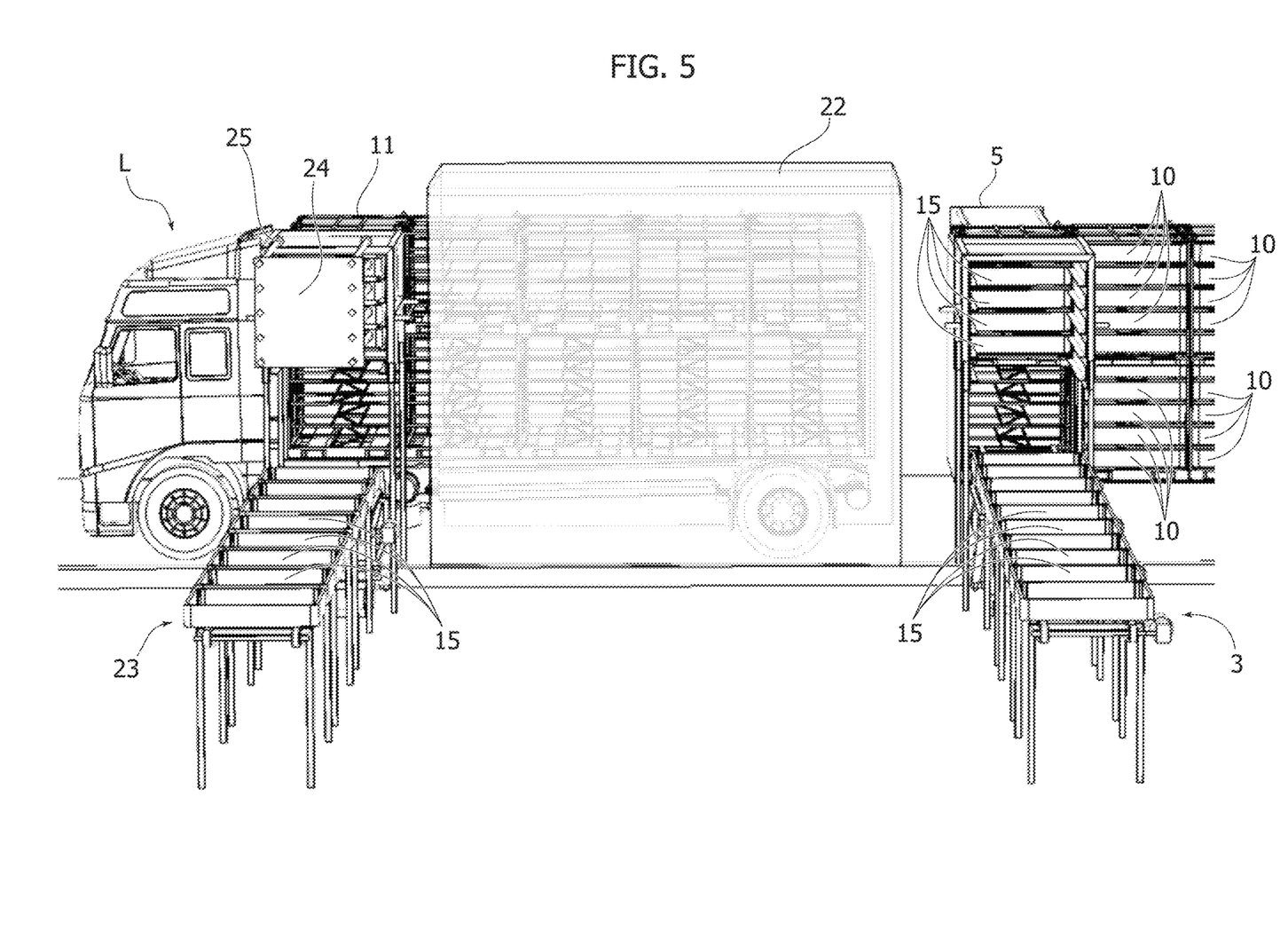
FIG. 5 is a front elevation View of FIG. 3, on are enlarged scale.

The variant of the handling system according to the invention represented in FIGS. 3 to 5 differs from the previously described embodiment in that the inlet station of the transport units 10 (or 100), instead of being formed by the conveyor 2, is formed directly by the loading platform P of a transport lorry L. In the case of the illustrated example, the transport units 10 are arranged in pairs superimposed on the platform P, and both the receiving structure 6 and the extraction device 5 are designed to be vertically positioned, first at a higher level corresponding to the higher transport unit 10, and then at a lower level corresponding to the lower transport unit 10 of each pair in order to receive, in turn, the two respective stacks of drawer-like cages 15. Even the initial portion of the transfer line 3, indicated by 3a in FIG. 4, can be vertically displaced, for example by means of a motorized pantograph device 21 to adapt to the level of the loading, platform P of the lorry L, which, in turn, advances to position the transport units 10 between the extraction device 5 and the receiving structure 6.

In this case, immediately downstream of the inlet station 1, a washing station 22 of the supporting frames 11 of the transport units 10 will be provided, from which the drawer-like cages 15 have been extracted. Following washing, the empty drawer-like cages 15, coming from a return line 23, are reintroduced into the supporting frames 11 arranged on the platform P of the lorry L by means of a reinsertion pushing device 24 and a receiving structure 25 completely analogous to the extraction device 5 and to the receiving structure 6, and operating in the reverse order.

Figure 6:
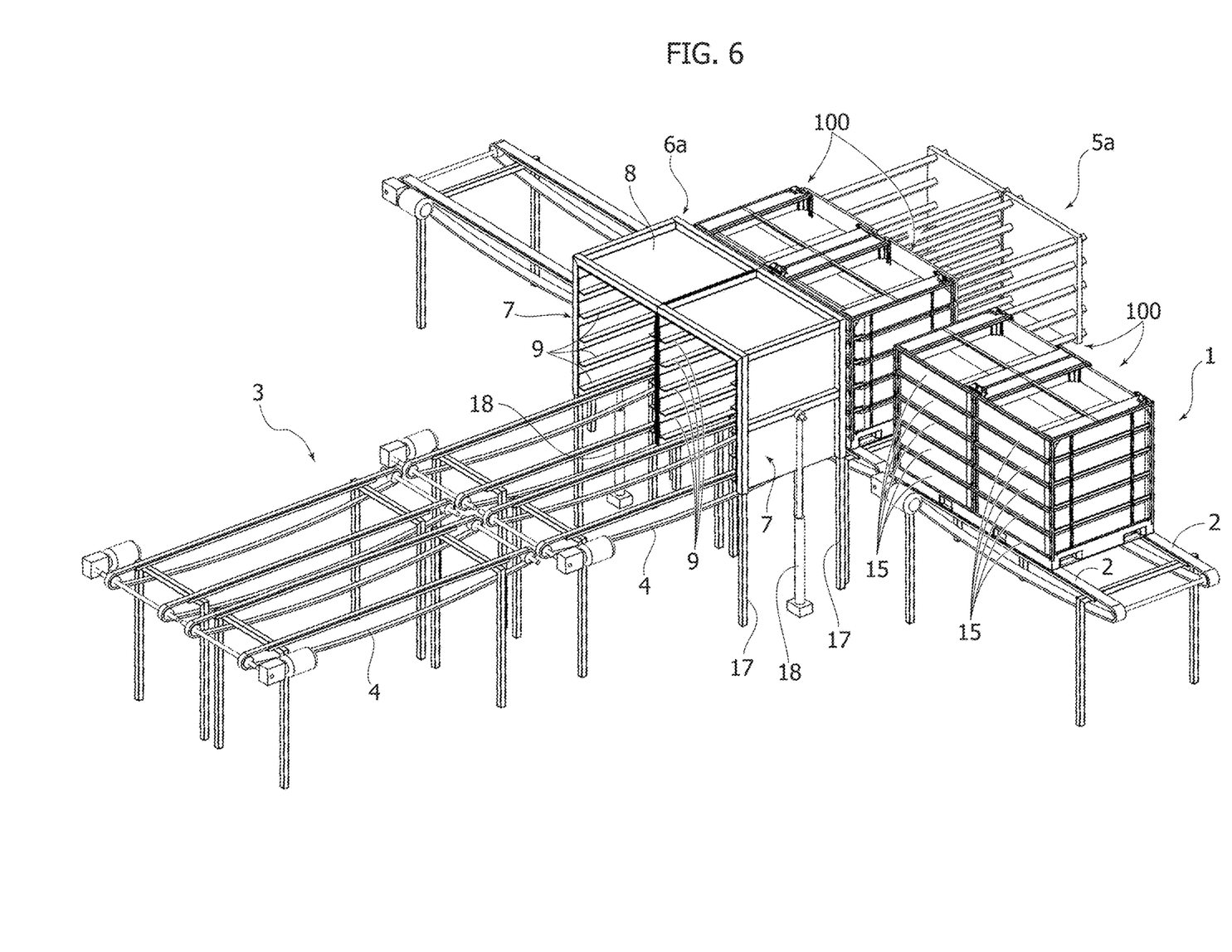
FIG. 6 is a schematic perspective view that illustrates a third embodiment of the handling system according to the invention.

The handling system represented in FIG. 6 is relative to the case of operation with the single transport units 100 of FIG. 8. In this case, both the extraction device, indicated by 5a, and the rigid receiving structure, indicated by 6a, are double, in such a way so that the stacks of drawer-like cages 15 of two contiguous transport units 100 are, in turn, simultaneously removed from the relative supporting frames 11, through the respective sides A or B, with a side-by-side arrangement, transversely to the transfer line 3. The drawer-like cages 15 are, therefore, deposited in twos in a side-by-side condition on the transfer line 3, in this case double as well.

Of course, the details of construction and the embodiments may be widely varied with respect to what is described and illustrated, without departing from the scope of the present invention as defined in the following claims.

The invention claimed is:

1. A handling system for transport units of live poultry in a slaughterhouse:
   the transport units each including a supporting frame, the supporting frame including and supporting at least one stack of drawer-like cages superimposed and slidably extractable along horizontal guides through an extraction side of said supporting frame, the system comprising:
   an inlet station of said transport units;
   at least one transfer line arranged transversally to the inlet station for receiving drawer-like cages extracted from the supporting frames;
   an extraction device of the drawer-like cages, located, with respect to the inlet station, on an opposite side of said transfer line and which extracts said drawer-like cages from the transport units by pushing them through said extraction side of the respective supporting frames; and
   a rigid receiving structure configured to receive the drawer-like cages extracted by the extraction device, the rigid receiving structure interposed between said inlet station and said at least one transfer line, said rigid receiving structure equipped with supports arranged as said horizontal guides of the supporting frames of the transport units, said rigid receiving structure being vertically displaceable between a position of receipt of the extracted drawer-like cages and a depositing position of the drawer-like cages onto said transfer line,
   wherein said extraction device is configured to simultaneously extract a stack of superimposed drawer-like cages from each of two respective transport units arranged in a side-by-side condition, transversally to said transfer line, and the rigid receiving structure is configured for simultaneous receipt of the two extracted stacks of drawer-like cages and for separate depositing of the drawer-like cages of each of the two stacks.

2. A handling system according to claim 1, wherein said rigid receiving structure is closed laterally and at a top.

3. A handling system according to claim 1, wherein the supporting frame of each transport unit contains two side-by-side stacks of superimposed drawer-like cages.

4. A handling system according to claim 1, wherein the supporting frame of each transport unit contains a single stack of superimposed drawer-like cages.

5. A handling system according to claim 1, wherein said inlet station consists of a motorized conveyor designed to receive the transport units unloaded from the loading platform of a transport vehicle.

6. A handling system according to claim 1, wherein said inlet station consists of the loading platform of a transport vehicle.

7. A handling system according to claim 1, further comprising a washing station associated with said inlet station to wash the supporting frames of the transport units following extraction of the respective drawer-like cages.

8. A handling system according to claim 1, further comprising a rigid receiving structure of the emptied drawer-like cages coming from a return line and again superimposed in stacks, and a re-introduction device to transfer said stacks of drawer-like cages from said receiving structure into the supporting frames of the respective transport units.

9. A handling system according to claim 2, wherein the supporting frame of each transport unit contains two side-by-side stacks of superimposed drawer-like cages.

10. A handling system according to claim 2, wherein the supporting frame of each transport unit contains a single stack of superimposed drawer-like cages.

11. A handling system according to claim 2, wherein said inlet station consists of a motorized conveyor designed to receive the transport units unloaded from the loading platform of a transport vehicle.

12. A handling system according to claim 3, wherein said inlet station consists of a motorized conveyor designed to receive the transport units unloaded from the loading platform of a transport vehicle.

13. A handling system according to claim 4, wherein said inlet station consists of a motorized conveyor designed to receive the transport units unloaded from the loading platform of a transport vehicle.

14. A handling system according to claim 2, wherein said inlet station consists of the loading platform of a transport vehicle.

15. A handling system according to claim 3, wherein said inlet station consists of the loading platform of a transport vehicle.

16. A handling system according to claim 4, wherein said inlet station consists of the loading platform of a transport vehicle.

17. A handling system according to claim 1, wherein said two stacks of drawer-like cages are arranged at said inlet station in a side-by-side condition transversally to said transfer line.

18. A handling system according to claim 1, wherein said two stacks of drawer-like cages are arranged at said inlet station in a side-by-side condition parallelly to said transfer line.

* * * * *